March 16, 1965 J. A. MADRE 3,173,423
VIBRATING FEED TABLE FOR A SEED POD SHELLER
Filed June 17, 1963 2 Sheets-Sheet 1

INVENTOR.
JAMES A. MADRE
BY
ATTORNEYS.

March 16, 1965  J. A. MADRE  3,173,423
VIBRATING FEED TABLE FOR A SEED POD SHELLER
Filed June 17, 1963  2 Sheets-Sheet 2
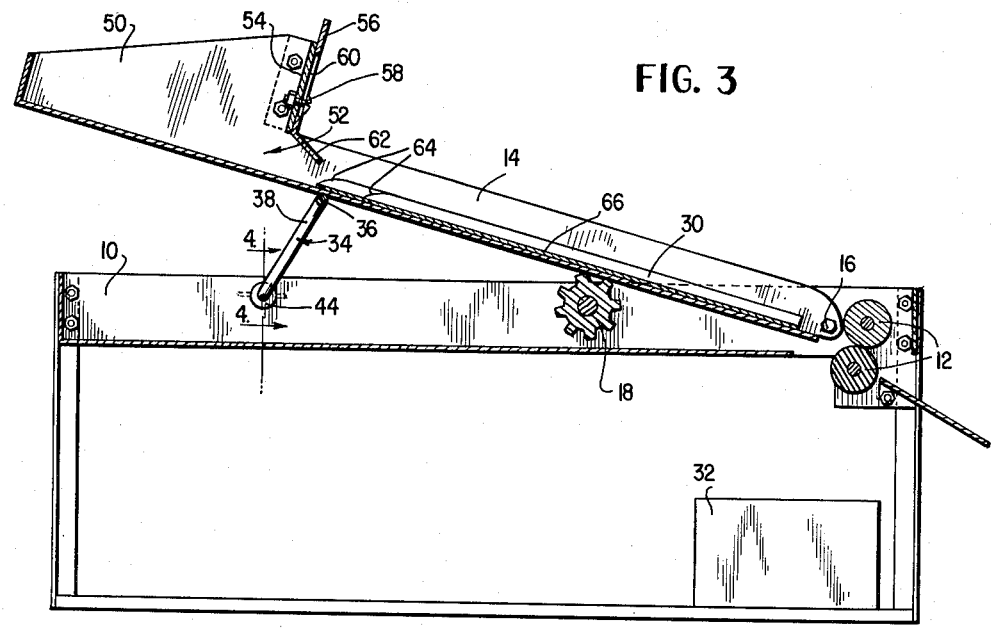
FIG. 3
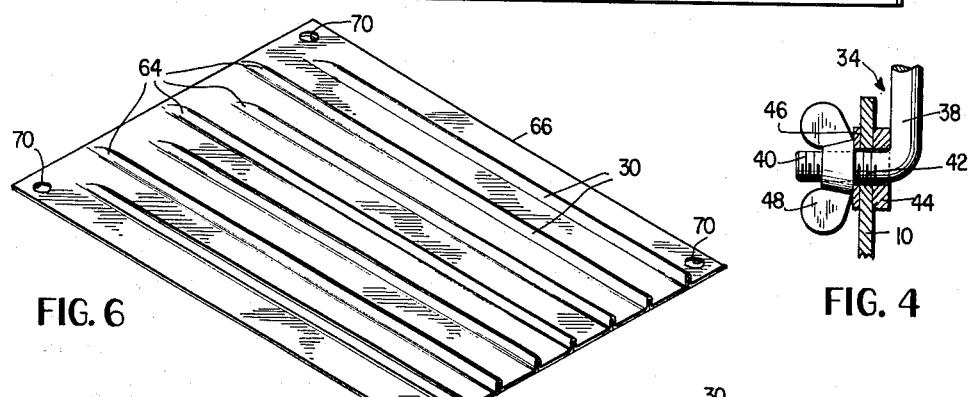
FIG. 6
FIG. 4
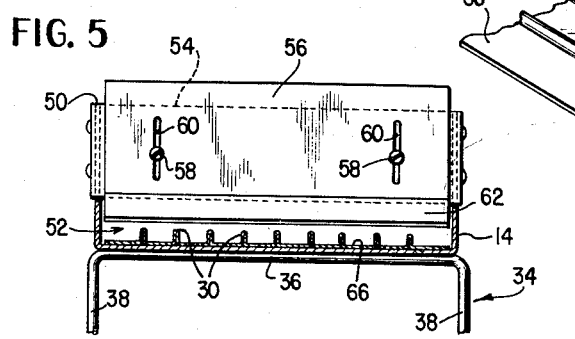
FIG. 5
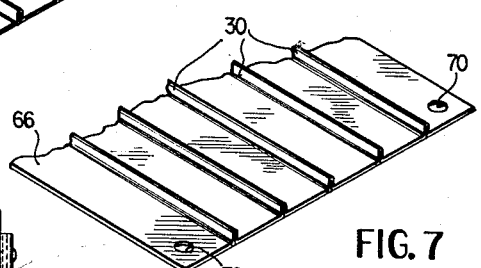
FIG. 7
INVENTOR.
JAMES A. MADRE
BY
ATTORNEYS.

3,173,423
VIBRATING FEED TABLE FOR A SEED POD SHELLER
James Agustus Madre, Box 452, Rte. 4,
Elizabeth City, N.C.
Filed June 17, 1963, Ser. No. 288,095
3 Claims. (Cl. 130—30)

The novel features that are considered characteristic one adapted to shell beans and peas, and more particularly to such a sheller that is vibrated to cause the pods to be fed to the sheller rollers.

In the usual seed pod sheller, the pods are deposited upon a chute leading to a pair of pressure rolls which squeeze the pods to express the seeds therefrom and separate the pods from the seeds. Frequently the chute is vibrated or agitated in some manner to cause the pods to flow toward the pressure rolls. It has been found, however, that the prior seeders are frequently incapable of causing smooth flow and proper orientation of the pods toward the pressure rolls, and that the efficiency in operation of these shellers varies considerably according to the weight of the load of pods fed onto the chute.

The weight referred to encompasses both the total weight of the volume of pods as well as the size and weight of the individual pods. If the pods are small in size and lightweight both individually and in total volume, the vibration may be sufficient to cause the pods to jump so that they do not feed properly into the pressure rolls. On the other hand if the weight of the load and/or the individual pods are relatively heavy, then the vibration may be insufficient to cause smooth flow of the pods to the pressure rolls.

Having in mind the defects of the prior art apparatus, it is the primary object of the present invention to provide a seed pod sheller that is capable of uniform operation regardless of the weight of the seed pods fed to it.

It is another object of the invention to provide a sheller having means for regulating the vibration imparted to the feed chute in accordance with the weight of the pods being fed.

It is a further object of the invention to provide a sheller having means for properly orienting the pods as they are fed to the pressure rolls and to prevent blockage of flow of such pods.

It is a still further object of the invention to provide a seed pod sheller having simplicity of design, economy of construction and efficiency in operation.

Briefly, a seed pod sheller in accordance with the present invention comprises a chute pivotally mounted at its end adjacent the pressure rolls and adapted to be vibrated by a rotary vibrating member in combination with an adjustable support engageable with the chute to vary the angle thereof to determine the degree of vibration imparted to the chute by the vibrating member. A feed hopper having an adjustable gate is provided at the upper end of the chute so as to regulate the volume of flow of the pods and the bed of the chute is provided with upstanding partitions longitudinally of the chute and spaced to receive pods longitudinally therebetween, with the upper ends of the partitions being tapered to a point and being staggered in spaced relation to the hopper outlet to prevent the pods from hanging up on the upper ends of the partitions and blocking the channels therebetween. In order to accommodate pods of different size, the partitions preferably are formed on removably mounted bed plates with the spacing between the partitions being varied on different plates so that a suitable bed plate may be fixed in the chute according to the size of the pods being shelled.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 3 is a cross-sectional view taken on line 3—3 of FIG. 2;

FIG. 4 is an enlarged fragmentary cross-sectional view taken on line 4—4 of FIG. 3;

FIG. 5 is a fragmentary cross-sectional view taken on line 5—5 of FIG. 1;

FIG. 6 is a view in perspective of a bed plate for removably mounting in the feed chute, and FIG. 7 is a fragmentary view in perspective of an alternate bed plate.

Figures 1, 2:
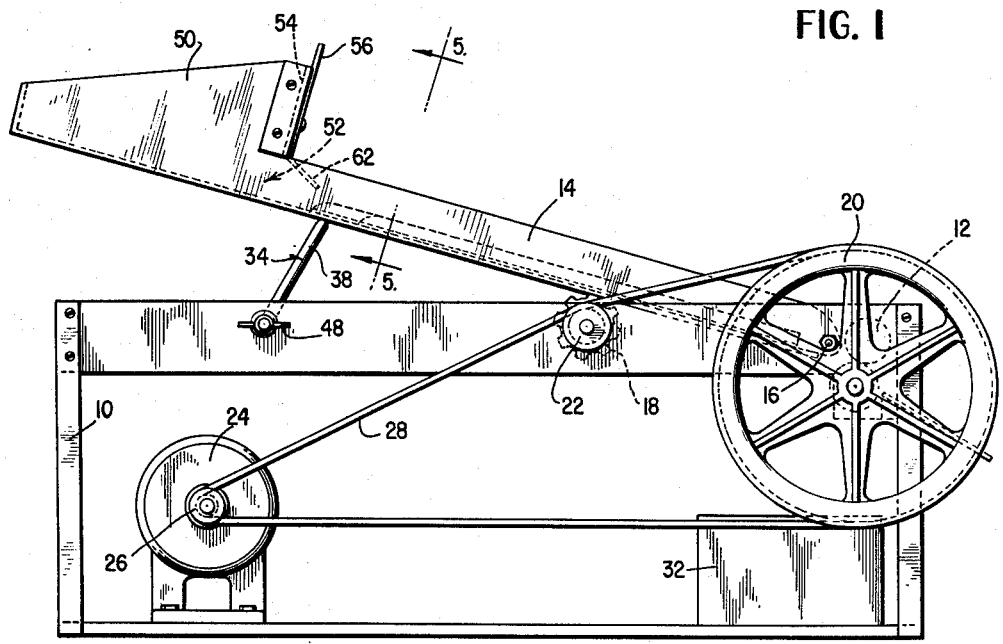
FIG. 1 is a side view in elevation of a seed pod sheller in accordance with the present invention.
FIG. 2 is a top plan view of the sheller shown in FIG. 1.

Referring now to the drawings in detail, specifically to FIGS. 1–3, a sheller in accordance with the present invention comprises a base frame 10 having a pair of pressure rollers 12 journaled within the frame at one end thereof and an inclined feed chute 14 mounted on the frame with its lower end adjacent the pressure rollers 12. The lower end of the chute 14 may be pivotally mounted to the frame as by studs 16, and the bottom of the chute may rest on a rotary vibrator member 18 having a plurality of toothlike protrusions engaging the bottom of the chute.

A drive pulley 20 may be in driving relation with at least one of the pressure rollers 12, and a second pulley 22 may be in driving relation with the vibrator member 18. A motor or other power means 24 is mounted on the frame 10 and has a drive pulley 26, and a belt 28 is trained around the drive pulley 26 and the pulleys 20 and 22 to drive the latter. The pulley 22 is relatively small in diameter to drive the vibrator member at a relatively high speed, whereas the pulley 20 has a relatively large diameter to drive the pressure rollers 12 at a relatively low speed so as to squeeze the pods without crushing the seeds therein.

To facilitate the alignment of the pods longitudinally of the chute so as to be fed endwise between the rollers, the bottom of the chute may be provided with spaced upstanding partitions 30 extending longitudinally thereof and subdividing the surface of the chute into a plurality of channels of a width generally corresponding to the thickness of the pods. Thus, as the pods move down the chute, they fall between the partitions 30 and into the channels formed thereby so as to be oriented longitudinally of the chute before reaching the pressure rollers.

The foregoing structure is basically the equivalent of the prior art shellers although somewhat simpler in design and organization, and consequently less expensive. In shelling operations, the pods are fed onto the upper end of the chute 14 and caused to slide down the chute by the vibration imparted by the member 18 to be fed to the pressure rollers 12. As the pods are fed into the rollers 12, the rollers squeeze the pods to break them open so that the seeds fall freely in front of the rollers into a suitable receptacle 32 while the pods are fed through the rollers to be separated from the seeds, and may also be fed into a refuse receptacle, not shown.

As previously stated, it has been found that the efficiency of a vibratory sheller of this type varies greatly according to the weight of the pods being shelled, this weight referring both to the total weight due to volume as well as to individual weight due to the size of the pods. For example, with relatively light pods, both individually and in volume, the vibration may be too heavy and cause the pods to bounce and jump from the chute so that they do not feed properly into the pressure rolls and frequently either bounce out of the chute or completely over the rolls. Conversely, with relatively heavy pods, either individually or by volume, the vibration may be insufficient to cause the pods to flow down the chute uniformly and at proper speed for maximum efficiency in operation.

To overcome the foregoing difficulties, the present invention provides means for regulating the degree or amplitude of vibration imparted to the chute and thereby the flow of pods to the chute. To control the degree of vibration, an adjustable support 34 is mounted on the base frame 10 and is engageable with the bottom of the chute to vary the angle of the chute and the incidence of engagement thereof with the vibrator member 18, and amplitude of movement resulting therefrom. Conveniently, the support 34 comprises a baillike rod bent into U-shape and including a bight portion 36 engageable with the bottom of the chute, arms 38 generally perpendicular to the bight portion, and end portions 40 extending outwardly of the arms to pass through apertures 42 in the sides of the base frame 10.

The end portions 40, as best shown in FIG. 4, are threaded and are provided with a washerlike clutch element 44 adjacent each arm 38 for frictional engagement with the inner surface of the respective side of the frame 10, and a washer 46 and wing nut 48 are mounted on each end portion 40 externally of the frame 10. Thus, the support 34 may be pivotally adjusted to position the bail portion 36 at a selected height and secured in selected position by tightening the wing nuts 48 to clamp the sides of the frame 10 between the washers 44 and 46. If the washerlike members 44 are loose on the end portions 40, then the nuts 48 are tightened sufficiently to also clamp the arms 38 securely against the washers 44 with the latter clamped between the arms 38 and the inner sides of the frame 10.

The support 34 is adjusted in accordance with the weight of the seed pods on the chute 14. If the pods are large and the weight relatively heavy, the support is swung down free of the chute so that the latter rests fully on the vibrator member 18. In this position, the chute receives the maximum vibration. On the other hand, if the pods are small and the weight relatively light, the support 34 is swung upwardly to lift the chute slightly to reduce the amplitude of vibration imparted by the member 18.

To further control the free and smooth flow of the pods, the chute 14 is provided with a hopper 50 at its upper end and having an outlet or discharge 52 in its front wall 54 opening to the upper end of the chute proper. A gate 56 is mounted on the front wall 54 above the opening 52 by means of bolts 58 extending through vertical slots 60 in the gate 56. Upon loosening the bolts 58, the gate 56 may be adjusted vertically to selectively vary the size of the opening and thereby regulate the discharge of pods from the hopper 50. The gate 56 has a forwardly and downwardly inclined lip 62 which serves to orient the pods parallel with the bottom of the chute as they pass through the opening 52.

To prevent the pods from hanging up on the upper ends of the partitions 30 as the pods pass through the opening 52, the upper partition ends 64 are tapered to a point and are in staggered relation to the discharge opening. Alternate ends of the ends 64 are spaced farther from the opening than intermediate ends so that even if the pods are positioned transversely as they engage the ends 64, they will not be held in transverse position by spanning two adjacent ends but will swing around into longitudinal alignment.

The partitions 30, as best shown in FIGS. 2, 6 and 7, preferably are fixed on a bed plate or tray 66 removably mounted on the floor or bottom of the chute 14. Conveniently, the tray 66 may be formed of sheet metal with the partitions 30 formed or impressed therefrom. The tray may be secured by screws or bolts 68 passing through apertures 70 in the corners of the tray. Preferably, each sheller is provided with a plurality of trays 66 with partitions 30 of the respective trays differently spaced, as shown in FIGS. 6 and 7, to accommodate different sized pods. For example, there may be a set of three trays with partitions on each spaced 1¼, 1¾ and 2¼ inches respectively.

In operation, upon determination of the size of the pods to be shelled, the tray 66 with the properly spaced partitions 30 is mounted in the chute 14 and the hopper gate 56 is adjusted to the proper height. The vibrator 18 and pressure rolls 12 are then started and the chute support 34 adjusted to properly regulate the vibration of the chute. For example, if the pods are small and light in weight so that they are thrown out of the channels between the partitions, the support is raised to reduce the amplitude of vibration. However, if the pods are large and heavy so that their movement down the chute is slow and sluggish, the support is lowered to increase the amplitude of vibration. As the pods pass through the hopper discharge 52, the gate lip 62 serves to orient them flatwise and parallel with the chute floor and the staggered partition ends 64 precludes the pods from spanning transversely two adjacent ends and hanging up to block the flow of pods.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A seed pod sheller comprising a support, a pair of cooperating pressure rolls journaled on said support to receive pods and express seeds therefrom, a downwardly inclined feed chute having a hinge connection near its bottom on said support so as to present the lower, discharge end adjacent to and leading toward said rolls, an arm pivotally mounted on said support and providing a seating for the upper portion of said chute, a shaft having a plurality of spaced, cam-like ribs rotatably mounted on said support between said hinge connection and said arm, said ribs engaging the bottom of said chute to vibratingly lift the latter to cause pods to slide downwardly toward said rolls, power means operatively connected to rotate both said pressure rolls and said ribbed shaft for vibrating the chute, and means for clamping said arm at a selected angle to vary the amplitude of vibration imparted to said chute by said ribs of the shaft.

2. A sheller according to claim 1, further comprising a feed hopper at the upper end of said chute and having an outlet at the bottom thereof opening onto said chute, a gate adjustably mounted on said hopper for selectively varying the size of said outlet to regulate the flow of pods, and a plurality of trays each selectively removably mounted in said chute between said hopper outlet and said rolls, said trays having upstanding longitudinal partitions dividing the chute into a plurality of individual channels to guide the pods longitudinally thereof the partitions of one tray being differently spaced from those of another, replacement of said trays one by another serving to vary the channel widths according to the size of pods being shelled, the upper ends of said partitions being tapered to a point and being staggered in spaced relation to said hopper outlet to prevent the pods from hanging up on said partitions and blocking said channels.

3. A sheller according to claim 1 wherein said shaft is disposed parallel to said pressure rolls, and said cam-like ribs are positioned on the periphery of the shaft and extend longitudinally thereof.

(References on following page)

References Cited by the Examiner

UNITED STATES PATENTS

| | | | |
|---|---|---|---|
| 394,630 | 12/88 | Wilson | 130—30 |
| 858,608 | 7/07 | Krmpotic | 130—30 |
| 1,108,691 | 8/14 | Bullard et al. | 130—30 |
| 1,798,543 | 3/31 | Kodama | 130—30 |
| 2,804,873 | 9/57 | Williams et al. | 130—30 |
| 2,820,459 | 1/58 | Russell | 130—30 |

FOREIGN PATENTS 40,145   8/87   Germany.

T. GRAHAM CRAVER, *Primary Examiner.*

ANTONIO F. GUIDA, ARNOLD RUEGG,
*Examiners.*